United States Patent [19]
Leitheiser et al.

[11] Patent Number: 4,892,919
[45] Date of Patent: Jan. 9, 1990

[54] TEREPHTHALIC CONTAINING HYBRID CASTABLE RESINS

[75] Inventors: Robert H. Leitheiser, Port Washington; Joan E. Karloske, Saukville, both of Wis.

[73] Assignee: Freeman Chemical Corporation, Port Washington, Wis.

[21] Appl. No.: 276,802

[22] Filed: Nov. 28, 1988

[51] Int. Cl.$^4$ .............................................. C08G 18/62
[52] U.S. Cl. ........................................ 528/48; 528/75
[58] Field of Search ................................. 528/48, 75

[56] References Cited

PUBLICATIONS

Handling and Physical Properties of Hybrid Polyesters, by H. R. Edwards–39th Annual Conference, Reinforced Plastics/Composites Institute, The Society of the Plastics Industry, Inc./Jan. 16–19, 1984 (pp. 1–8, Session 8–C).

The Applicantion of Isophthalic Unsaturated Polyester Urethane Hybrids in Conventional Molding Techniques, by H. R. Edwards–42nd Annual Conference Composites Institute, The Society of the Plastics Industry, Inc.,/Feb. 2–6, 1987 (pp. 1–6, Session 8–C).

*Primary Examiner*—Maurice J. Welsh
*Attorney, Agent, or Firm*—Arnold J. Ericsen; C. Thomas Sylke

[57] ABSTRACT

Hybrid resins result from the combination of the urethane and unsaturated polyester technology. Improved resin casting and laminate properties are obtained when polyalkylene terephthalate unsaturated polyesters are employed, in lieu of the isophthalic polyesters of the prior art. Especially notable are improved heat distortion temperatures which exceed substantially those of the isophthalic based resins. The economics of using such terephthalate resins is demonstrated. Also within the scope of the present invention is the use of secondary hydroxyl compounds in the preparation of the polyesters. It has previously been believed that such compounds led to embrittlement of the final hybrid.

16 Claims, No Drawings

TEREPHTHALIC CONTAINING HYBRID CASTABLE RESINS

BACKGROUND OF THE INVENTION

1. Field of the Invention

The present invention relates generally to the art of castable resins which contain reactive sites capable of urethane chain extension or crosslinking and which also contain unsaturation, preferably in the polyester component of the resin, to provide improvement to the final resin physical properties through the mechanism of free radical crosslinking of the unsaturated sites. More specifically, the invention relates to hybrid castable resins which include terephthalic moieties in the polyester chain, and still more specifically to such resins prepared using secondary hydroxyl containing materials for preparation of the polyester component.

2. Description of the Prior Art

Hybrid polyester resins have been known for several years and are described in considerable detail by H. R. Edwards in papers presented in 1984 and 1987. See "Handling and Physical Properties of Hybrid Polyesters" reported at Session 8-C, Pages 1-8 of the proceedings of the 39th Annual Conference/Reinforced Plastics/Composites Institute, The Society of the Plastics Industry, Inc., Jan. 16-19, 1984 and "The Application of Isophthalic Unsaturated Polyester Urethane Hybrids in Conventional Molding Techniques"—Session 8-C, Pages 1-6, 42nd Annual Conference/Composites Institute, The Society of the Plastics Industry, Inc., Feb. 2-6, 1987.

In his papers, Edwards points out the versatility of hybrids which result from the reaction of unsaturated polyester glycols with diisocyanates diluted in styrene monomers. He explains that early work on the concept of blending urethane and unsaturated polyester technologies did not immediately result in commercial products. Amoco Chemicals Company, Edward's employer, introduced isophthalic unsaturated polyester urethane hybrids to overcome the commercial viability problem and was still producing commercial systems of this type up to the time of this invention.

The Amoco systems comprise three low molcular weight unsaturated polyesters with available hydroxyl groups, which are diluted with styrene monomer. The glycols used are ethylene glycol, diethylene glycol, and neopentyl glycol. These polyesters are reacted with polyisocyanates such as a modified MDI or a polymeric MDI (4'4-diphenylmethane diisocyanate). Edwards discusses glycol and acid selection in terms of equivalent weight and geometry and the use of the hybrid materials in machine casting, resin transfer molding, reaction injection molding, spray-up, pultrusion and press molding. He concludes that work through the date of his last paper has resulted in commercialization of a resin having high impact strength and high modulus, along with ease of handling. He also recognizes that "even at lower equivalent weight, the use of—glycols containing secondary hydroxyls results in embrittled cured hybrids" (1987 paper, page 1) and focuses attention on the use of isophthalic acid to provide "the best compromise of styrene compatability with the proper configuration for linear molecular weight development" (1987 paper, page 1).

The physical properties of the resins described by Edwards are quite good, but his systems suffer from several drawbacks when compared to the systems suggested by the present invention. Foremost among the disadvantages of the earlier systems is a relatively low heat distortion temperature (HDT) for resins with notched Izod impacts of 1.0 or greater. In addition, the present invention provides for the use of relatively inexpensive starting materials for the polyester, i.e. the use of terephthalic acid groups, and the ability to use, and even the desirability of using, secondary hydroxy containing materials for polyester formation. The present invention departs from the teachings of the Edwards work and yields lower cost hybrid castable polymer systems having even better properties. The resins of the present invention, possessing very desirable "toughness" and substantially improved heat distortion temperatures, represent a substantial breakthrough in the art.

It would also be desirable to use materials other than styrene as the unsaturated diluent, and the present invention contemplates the use of vinyl toluene for such purposes.

OBJECTS AND SUMMARY OF THE INVENTION

It is the principle object of the present invention to provide hybrid polyester urethane resin systems which have improved physical properties when compared to hybrid resin systems of the prior art.

Another object of the present invention is to provide hybrid polyester urethane resin systems which include polyester components prepared at least in part from terephthalic acid moities.

A further object of the present invention is to provide such hybrid resin systems using lower cost raw materials such as, for example, raw materials prepared from recovered PET.

A still further object of the present invention is to provide such hybrid resins systems which include polyesters made at least in part from secondary hydroxyl compounds, without sacrificing physical properties.

Yet another object of the present invention is to provide hybrid resin systems which include vinyl toluene as the vinyl containing substitute, providing desirable improvement in the safe handling properties of the resin system.

How these and further objects of the invention are accomplished will be described in the following detailed description of the preferred embodiment and the working examples. Generally, however, the objects are accomplished by providing polyester-urethane hybrid resin systems which have desired diluent compatability and which include, at least in part, terephthalic acid esters and secondary hydroxyl containing entities. Resin systems employing vinyl toluene as the diluent are also disclosed. Systems of the present invention give surprisingly high heat distortion temperatures without embrittlement which has been suggested as a problem with hybrid resins containing either terephalic acid or secondary hydroxyls. Substantial raw material cost savings are enjoyed without sacrifice of properties. HDT values are increased despite suggestions in the above referenced papers that only increasing maleic acid levels would produce the desired increase in HDT. Other ways in which the objects of the invention are accomplished will become apparent to those skilled in the art after the present specification has been read and understood. Such other ways are intended to fall within the scope of the present invention if they fall within the scope of the claims which follow, or equivalents thereof.

DESCRIPTION OF THE PREFERRED EMBODIMENT

As a starting point for explaining the present invention, reference will be made to isophthalic acid containing hybrid resins of the prior art. The Amoco Chemicals Company material (believed to consist of isophthalic acid, maleic acid and diethylene glycol with suitable catalysts) was reacted according to the manufacturer's directions. Physicals of the styrene diluted, MDI reacted material (cured at 100° C. for a period of 4 hours), include a heat distortion temperature (HDT) of 56° C., tensile strength of 10,400, tensile modulus $\times 10^5$ of 3.77, 7% elongation, flexural modulus $\times 10^5$ of 4.35, notched Izod of 1.1 and unnotched Izod of 14.7.

One component of the hybrid resin system of the present invention is a polyester prepared from hydroxy containing compounds and unsaturated diesters or acid materials. The prior art has recognized that common glycols such as ethylene glycol, diethylene glycol and neopentyl glycol (all primary hydroxyl compounds) can be used for hybrids. According to this invention a wide variety of other materials can be used, such as dipropylene glycol, tripropylene glycol and various blends thereof. The ether linkage present in such materials allow even greater toughness in hybrid resins. Among such other hydroxyl compounds useful in the preparation of the polyester component of the hybrids of the present invention are 1,3-propane diol; 1,4-butanediol; 1,6-hexanediol; 1,4-dimethylol-cyclohexane; neopentyl-glycol; 2-methyl-1,3-propanediol.

The acid material useful in the present invention should contain polyalkylene terephthalic units, preferably in substantial quantity. An example of such a material was prepared by reacting 50.32 grams of an 85%/15% dipropylene glycol, tripropylene glycol blend with 14.69 grams of PET, 12.71 grams isophthalic acid and 15.00 grams maleic anhydride. Water loss of 5.50 grams yielded a polyester having an approximate 2:1 TPA:PET ratio. When reacted in the presence of styrene and polymeric MDI with normal hybrid catalysts for the two reactions, casting having a flex strength of 17,700 and a tensile strength of 9,200 was produced.

The surprising improvement of the present invention was noted when only PET (1033 grams) was cooked in a two stage cook, first with DEG (950) grams and 442 grams of the aforementioned DPG/TPG blend and then with 703 grams of maleic anhydride. This polyester material was blended with 1000 grams of styrene and then 700 grams of the blend was reacted in the presence of hydroquinone inhibitor, diethanolamine, bismuth 2-ethylhexanoate and benzoyl peroxide catalyst with 96 grams of polymeric MDI to yield a casting having the following properties at a mold temperature of 130° F.:

| | |
|---|---|
| gel time | 1 min. 20 sec. |
| demold | 2 min. 40 sec. |
| postcure | 4 hrs. at 200° F. |
| durometer | 86D |
| Tensile Strength | 11,899(y)/10,481(b) |
| Tensile Modulus | 366,279 |
| % Elongation | 7.1 |
| Flex Strength | 20,829 |
| Flex Modules | 472,350 |
| Impact- | |
| notched Izod | 1.17 |
| unnotched Izod | 14.77 |
| HDT | 85° C. |

These properties are indicative of strong, tough resins, not the "embrittled" materials suggested by prior researchers in the hybrid resin art.

Similar results were obtained when the PET material was reacted with either the DPG alone or with the DPG/TPG blend alone. A comparison of certain physical properties follows:

| DPG (with PET and MA) | |
|---|---|
| Tensile Strength | 12,317 |
| Tensile Modulus | 375,182 |
| % Elongation | 6.7 |
| Flex Strength | 21,359 |
| Flex Modules | 375,169 |
| Impact - notched | 1.47 |
| unnotched | 6.81 |
| HDT | 80, 85 |
| DPG/TPG (with PET and MA) | |
| Tensile Strength | 11,843 |
| Tensile Modules | 410,872 |
| % Elongation | 5.87 |
| Flex Strength | 19.935 |
| Flex Modules | 467,408 |
| Impact - notched | 0.76 |
| unnotched | 7.95 |
| HDT | 72° C. |

These resin systems show considerable styrene compatability and demonstrate remarkable improvement in heat distortion temperatures over systems including some IPA, i.e. 1:1 IPA/PET (HDT 61° C.) with DEG and 1:1 IPA/PET (HDT 64° C.) with the DPG/TPG blend. The importance of the improvement in heat distortion temperature is readily apparent when it is recognized that many proposed uses for hybrid resins are high heat applications, such as for use in whirlpool spas and the like. The present inventors have discovered that increasing crosslink density cannot be used to increase HDT, as impact resistance is reduced. While many resin systems were prepared attempting to increase HDT by modifying the backbones in ways known to the art, success was not noted. Attempts to increase HDT by changing isocyanates also met with failure. Only the very substantial replacement of PET for IPA resulted in the 25° C.-30° C. increase in HDT actually shown, without degradation of resin or final casting physical properties. Neither the hydroxy number (polyester polyols having OH numbers between 90–269 were prepared) or the glycol ratio (see above examples) appears to be crucial to the improvement scenario. The change to PET appears to be the factor giving the improved results. Terephthalic acid with ethylene glycol can, or course, be substituted for PET.

Isocyanates widely known in the urethane art may be employed in the present invention, such as MDI, toluene diisocyanate and aliphatic diisocyanates such as isophorone diisocyanate, TMXDI, and dicyclohexylmethane-4,4'-diisocyanate. Catalysts such as those mentioned in the Edwards articles may be used for the urethane and the unsaturated polyester crosslinking reactions. Furthermore, it has been discovered here that optimum results are obtained if isomerization of the maleic anhydride to fumaric in the initial polyester reaction is promoted to the maximum extent possible, e.g. by delaying the addition of the DPG or DPG/TPG blend and/or by maintaining the acidity at a high level to promote such isomerization.

Reduction in raw material costs are substantial when PET, especially recycled bottle scrap or film chips, are substituted for IPA in the formation of our hybrid resins, but some problems still may exist if styrene is used as the crosslinking diluent. Information concerning the carcinogen risk of styrene led the present inventors to attempt the substitution of vinyl toluene for styrene. While vinyl toluene is higher in cost (at the present time), the physical properties obtained using vinyl toluene were comparable to those produced using styrene. Furthermore, the slight cost increase of the diluent is more than offset by the cost reduction resulting from IPA replacement by PET. Other diluents known in the unsaturated polyester art are useful in the present invention and include methyl methacrylate, ethylene glycol dimethacrylate, diallyl phthalate, diallyl ethers and esters.

The new hybrids of the present invention possess all the desirable molding and casting properties of the resins suggested in Edward's 1987 paper. Filled and unfilled systems, including glass reinforced systems, may be employed, and the materials of the present invention possess very desirable weathering and gloss retention properties. Machinability of the final products is also exceptional.

While several embodiments of the invention have been described in the foregoing description of the present invention, the scope of the invention is not to be limited to the examples, but only by the scope of the claims which follow.

What is claimed is:

1. A hybrid resin system which comprises an unsaturated polyester polyol, an unsaturated diluent, a diisocyanate and catalysts for promoting the urethane reaction between the polyol and the diisocyanate and the crosslinking reaction between the unsaturated bonds of the urethane and the diluent, the improvement comprising employing a terephthlate containing entity in the preparation of said polyester polyol as the principal aromatic diacid or diester component of said polyol.

2. The hybrid resin system of claim 1 wherein said terephthalic containing entity is selected from the group consisting of polyalkylene terephthalate or a combination of terephthalic acid and an alkylene glycol.

3. The hybrid resin system of claim 2 wherein said entity comprises polyethylene terephthalate.

4. The hybrid resin system of claim 1 wherein said polyol is prepared from at least one secondary hydroxyl containing polyol.

5. The hybrid resin system of claim 4 wherein said secondary hydroxyl containing polyol is selected from the group consisting of dipropylene glycol, tripropylene glycol and blends thereof.

6. The hybrid resin system of claim 1 wherein said reactive diluent is selected from the group consisting of styrene and vinyl toluene.

7. They hybrid resin system of claim 1 wherein said polyester polyol is prepared by reacting a terephthalate containing entity, a polyol and a material selected from the group consisting of maleic anhydride, fumaric acid or blends thereof.

8. The hybrid resin system of claim 7 wherein isomerization of said maleic anhydride to fumaric acid is promoted during the formation of said polyester polyol.

9. A polymeric casting prepared by reacting an unsaturated polyester polyol, an unsaturated diluent, a diisocyanate and catalysts for promoting the urethane reaction between the polyol and the diisocyanate and the crosslinking reaction between the unsaturated bonds of the urethane and the diluent, the improvement comprising employing a terephthlate containing entity in the preparation of said polyester polyol as the principal aromatic diacid or diester component of said polyol.

10. The polymeric casting of claim 9 wherein said terephthalic containing entity is selected from the group consisting of polyalkylene terephthalate or a combination of terephthalic acid and an alkylene glycol.

11. The polymeric casting of claim 10 wherein said entity comprises polyethylene terephthalate.

12. The polymeric casting of claim 9 wherein said polyol is prepared from at least one secondary hydroxyl containing polyol.

13. The polymeric casting of claim 12 wherein said secondary hydroxyl containing polyol is selected from the group consisting of dipropylene glycol, tripropylene glycol and blends thereof.

14. The polymeric casting of claim 9 wherein said reactive diluent is selected from the group consisting of styrene and vinyl toluene.

15. The polymeric casting of claim 9 wherein said polyester polyol is prepared by reacting a terephthalate containing entity, a polyol and a material selected from the group consisting of maleic anhydride, fumaric acid or blends thereof.

16. The polymeric casting of claim 15 wherein a blend is employed and isomerization of said maleic anhydride to fumaric acid is promoted during the formation of said polyester polyol.

* * * * *